United States Patent
Levand, Jr. et al.

[15] 3,652,302
[45] Mar. 28, 1972

[54] ANTIMONY BORATE GLASS COMPOSITIONS

[72] Inventors: Victor A. Levand, Jr., 1273 Croyden Road, Lyndhurst, Ohio 44124; Gene I. Thomasson, 13034 Woodcrest Lane, Chesterland, Ohio 44026; Richard H. Holcomb, 3843 Freemont Road, South Euclid, Ohio 44121

[22] Filed: Nov. 23, 1970

[21] Appl. No.: 92,016

Related U.S. Application Data

[62] Division of Ser. No. 3,012, Jan. 15, 1970, Pat. No. 3,588,315.

[52] U.S. Cl. ............................................................106/47 R
[51] Int. Cl. ............................................................C03c 3/00
[58] Field of Search ................................................106/47 R

[56] References Cited

OTHER PUBLICATIONS

Chemical Abstracts, Vol. 71, 1969, 73570M, pg. 264

*Primary Examiner*—Tobias E. Levow
*Assistant Examiner*—M. Bell
*Attorney*—Henry P. Truesdell, Frank L. Neuhauser, Oscar B. Waddell and Joseph B. Forman

[57] ABSTRACT

A glass for sealing metallic lead-in conductors in fused silica comprising a low melting antimony borate glass which preferably contains a small amount of molybdenum trioxide and which forms, at elevated temperatures, a molten seal surrounding the conductor.

2 Claims, 5 Drawing Figures

PATENTED MAR 28 1972 3,652,302

Inventors:
Gene I. Thomasson
Richard H. Holcomb
Victor A. Leyand, Jr.
by Henry P. Truesdell
Their Attorney

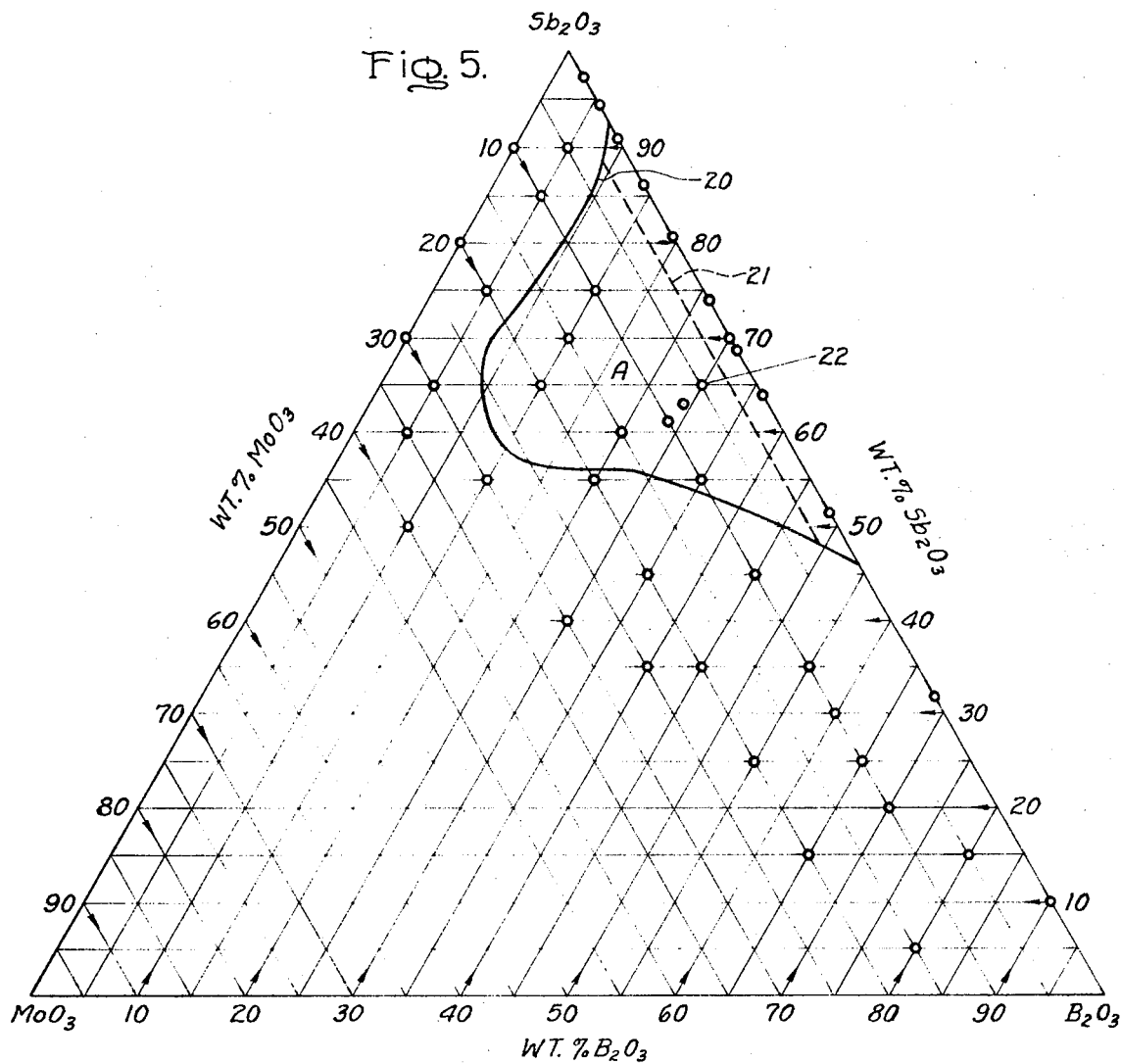

ANTIMONY BORATE GLASS COMPOSITIONS

This application is a division of application Ser. No. 3,012 filed Jan. 15, 1970, now U.S. Pat. No. 3,588,315.

BACKGROUND OF THE INVENTION

1. Field of the Invention

This invention relates to glasses for sealing metallic lead-in conductors in essentially fused silica or quartz for electrical devices comprising a sealed envelope containing electric energy translation means to which electric current is supplied through the lead-in conductors. More particularly, it relates to a novel glass composition for forming a molten seal between the quartz and a portion of the lead-in conductor enclosed thereby.

2. Description of the Prior Art

By way of example only, the invention will be referred to especially in connection with so-called tungsten halogen lamps which utilize a regenerative cycle. In such lamps the filament is connected at its ends to lead-in conductors which may be sealed through respective pinch seal portions at opposite ends of a lamp or through a single pinch seal at one end of the lamp. The lead-in conductors each generally include a very thin foil portion of molybdenum which is hermetically sealed in the pinch seal, and an outer lead wire portion of refractory metal which is generally also molybdenum and which is attached at one end to the foil portion and extends through the pinch seal to the exterior thereof. While the molybdenum foil forms a hermetic seal with the quartz because of the extreme thinness and resilience of the foil, the relatively heavy outer lead wire is not hermetically sealed because of its relatively large diameter and the difference in coefficient of expansion between the quartz and the molybdenum. Accordingly, slight capillary passages may be left between the quartz and the portion of the outer lead wire enclosed thereby. Atmospheric oxygen travels along the capillary passages to the foil which tends to oxidize at elevated temperatures above about 350° C. resulting in breakage of the electrical connection between the foil and the outer lead wire.

It has been found heretofore that the life of such seals could be materially increased in the elevated temperature range of about 500° to 800° C. by using outer lead wires consisting, at least at their surface, of platinum, and by filling the capillary passages around those wires with a lead borate glass composition which is molten at such temperature so that it forms a liquid seal against the entrance of atmospheric oxygen during operation of the lamps. The lead borate attacks and corrodes molybdenum, thereby necessitating the use of platinum or platinum-clad outer lead wires. Also, the lead borate does not melt and run sufficiently at temperatures below about 500° C. to be fully useful in the lower range of about 350° to 500° C.

SUMMARY OF THE INVENTION

The aforesaid deficiencies are overcome by the instant invention in which it is an object to provide an improved glass composition for seals of the type described, particularly in the temperature range of about 350° C. to at least 725° C. for relatively long lamp life. It is a further object to provide a molten glass material which is compatible with molybdenum and which will therefore afford a significant cost reduction.

In accordance with the invention, we have discovered that the above objectives are attained with a novel glass composition which affords a molten seal protection in the stated temperature range and which consists of a low melting antimony borate glass. We have found that further substantial improvement is obtained by incorporating in the glass a small amount of molybdenum trioxide. Further features and advantages of the invention will appear from the following detailed description.

BRIEF DESCRIPTION OF THE DRAWING

In the drawing,

FIG. 5 is a ternary chart showing variations in glass composition.

DESCRIPTION OF THE PREFERRED EMBODIMENTS

Figure 1:
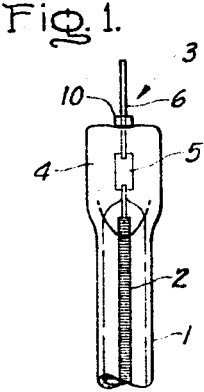
FIG. 1 is a fragmentary elevation of one end of a double-ended type of lamp embodying the invention.

Referring to FIG. 1 of the drawing, the lamp illustrated therein may be, for example, of the tungsten-halogen type comprising a tubular envelope 1 consisting essentially of fused silica which may be fused quartz or the product known as 96 percent silica glass and sold under the name Vycor. A helically coiled tungsten filament 2 extends axially of the envelope and is suitably connected at its ends to lead-in conductors 3 which are sealed through respective flattened press or pinch seal portions 4 at opposite ends of the envelope. The envelope 1 is filled with an inert gas such as nitrogen, argon, krypton or xenon or mixtures thereof. A small quantity of halogen such as iodine or bromine serves as a regenerative getter by combining with tungsten vaporized from the filament onto the envelope wall to form a compound containing the tungsten and halogen. This compound returns to the vicinity of the filament 2 where it is broken down and the tungsten redeposited onto the filament so that the halogen is free to return to the envelope wall to repeat the cycle.

The actual hermetic seal between the quartz seal portion 4 and the lead-in conductor 3 is at an extremely thin ribbon or foil portion 5, preferably of molybdenum. An outer lead wire portion 6 and an inner lead wire portion 7 are welded to respective ends of the foil 5. When the lamp is of the halogen cycle type, the inner lead wire 7 is preferably made of tungsten, and the outer lead wire 6 is also made of refractory metal, preferably molybdenum.

Figure 2:
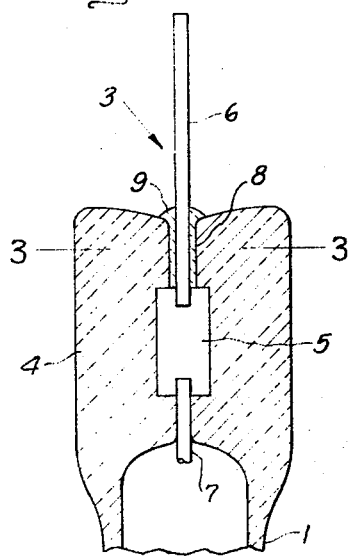
FIG. 2 is a longitudinal section, on an enlarged scale and along the line 2—2 of FIG. 3, which more clearly illustrates the seal in accordance with the invention.

Because of the difference in coefficient of expansion of the quartz and the relatively heavy outer lead wire portion 6, and also the manner of compressing the quartz to form the pinch seal 4, there is a slight capillary passage or passages 8 between the quartz and the part of the outer lead portion 6 enclosed therein shown in enlarged detail by FIG. 2. Atmospheric oxygen is thus given an opportunity to reach the outer end of the foil portion 5 which results in oxidation and breaking of the connection between the molybdenum foil 5 and the outer lead wire 6 at temperatures above about 350° C.

Seal life is materially increased, especially in the temperature range between about 350° C. to at least 725° C., by filling the capillary passages 8 with a low melting antimony borate glass, preferably containing a small amount of molybdenum trioxide in accordance with the invention. Such a glass, shown at 9 in FIG. 2, can be made to melt and flow at relatively low temperatures so that it forms a molten seal at elevated temperatures at which molybdenum would be oxidized. The molybdenum trioxide additive to the glass promotes wetting to the molybdenum lead wire, and it also serves to stabilize the glass. In some case tungsten trioxide can be substituted for the $MoO_3$. Moreover, the antimony borate glass does not attack the molybdenum outer lead wire 6 and foil 5 whereas lead borate compositions would attack the molybdenum lead 6 and must be kept away from the foil 5. The antimony borate glass also does not attack nickel which is used in some lamps as a fuse wire attached to the molybdenum lead wire at a point very close to the seal, as in U.S. Pat. No. 3,346,768 to G. F. Patsch.

A preferred method of introducing the antimony borate glass 9 into the passages 8, which may have a width of the order of a thousandth of an inch, is illustrated in FIG. 1. A small ring or bead 10 of the antimony borate glass composition is slipped over the end of the outer lead wire 6 and onto the end of the quartz seal portion 4. Heat is then applied to the surface of the pinch seal 4, preferably by a small oxyhydrogen flame applied locally to the area enclosing the outer lead wire 6, to cause the bead 10 to melt and be drawn into the capillary spaces or passages 8.

A preferred composition for the glass 9 which has given particularly good results is, by weight, 65% $Sb_2O_3$, 30% $B_2O_3$ and 5% $MoO_3$. Such a composition may be prepared from a batch composed of, or corresponding proportionately to, 65 grams $Sb_2O_3$, 53.3 grams $H_3BO_3$ and 5.0 grams $MoO_3$. The mixture of finely divided batch ingredients may be heated in a platinum crucible or other suitable container in air at about 800° C. until molten homogeneous glass is formed. It may then be quenched, for example, between water-cooled steel rolls, to form a powder from which the beads 10 are formed. Alternatively, the molten glass may be drawn into rod form and applied in that form by holding one end of a length of the rod against the outer lead wire 6 where it emerges from the heated quartz pinch seal 4 to thereby melt the end of the rod and draw the molten glass into the capillary passages 8.

Some physical properties of this preferred antimony molybdenum borate composition are: softening point, 350° C.; density, 3.52 grams/cc.; and thermal expansion coefficient (0°-300° C.), $100 \pm 10 \times 10^{-7}$/°C.

Figure 4:
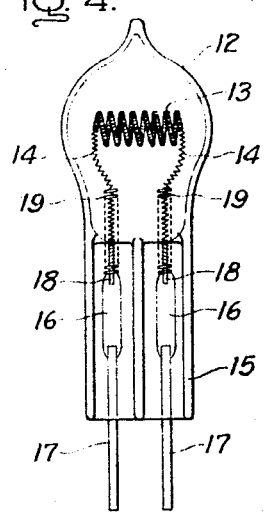
FIG. 4 is an elevation of a single-ended type lamp embodying the invention.

The single-ended type of lamp shown in FIG. 4 comprises a fused silica or quartz bulb 12 containing a helically coiled-coil tungsten filament 13 which extends transversely of the bulb axis and has helically single-coiled leg portions 14 which extend generally longitudinally of the envelope into a flattened pinch seal 15 at the end of the envelope. The outer ends of the filament leg portions 14, within the pinch seal 15, are connected to respective lead-in conductors preferably comprising a molybdenum foil portion 16 which is hermetically sealed in the pinch 15 and an outer lead wire 17 preferably of molybdenum and extending exteriorly of the pinch seal. The filament leg 14 is welded to the foil 16 and, for ease of welding, a short length of tungsten spud wire 18 is preferably provided in the interior of the leg portion 14 within the pinch seal.

Figure 3:
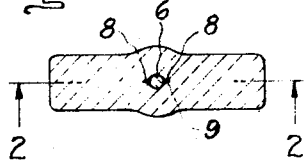
FIG. 3 is a transverse section, also on an enlarged scale and along the line 3—3 of FIG. 2, and which also illustrates more clearly the seal according to the invention.

As in the lamp of FIGS. 1-3, there are fine capillary passages around the portions of outer leads 17 embedded in the pinch 15, corresponding to passages 8 in FIGS. 2 and 3, and which are filled with the antimony borate glass as shown at 9 in said FIGS. 2 and 3.

The bulb may be filled with an inert gas such as nitrogen and a small quantity of halogen such as hydrogen bromide. An overwind coil 19 is preferably slipped over the ends of the filament legs 14 for reasons fully disclosed in U.S. Pat. No. 3,470,410 to G. F. Patsch. The lamp may be completed by cementing onto the pinch seal 15 a rectangular base (not shown) of refractory insulating material and having contact pins projecting from the bottom thereof and electrically connected to respective outer lead wires 17.

Testing of standard lamps with the application of the antimony borate glass indicates substantial decrease in lead wire oxidation and significant increase in lamp life. In the case of a single-ended type of halogen cycle lamp of very high compactness and high intensity, such as that shown in FIG. 4 and used for photographic purposes as a floodlight with movie cameras, designated in the industry by the code letters DVY, and rated at 650 watts on a 120 volt supply, seal temperatures during operation in a reflector are in the order of 550° to 575° C. Two series of fifteen lamps each were operated to termination of life with no seal failures using the preferred antimony molybdenum borate glass seals. Comparable testing indicated 100 percent failures before rated life of 25 hours without this protection.

In another test of 2,000 watt studio lamps of single-ended design having a coiled-coil filament extending axially of a 1 inch diameter envelope and operated in conventional fixtures, the standard lamps failed in approximately 25 to 50 hours. The same type of lamps containing the molten seal antimony molybdenum borate glass had an average life exceeding the rated 500 hours life with several lamps burning in excess of 700 hours.

Further testing indicated that even without the 5 percent addition of molybdenum trioxide, the basic antimony borate glasses are effective in increasing seal life, although not as fully effective as those containing the molybdenum.

In general, we have found that glasses similar to the preferred composition described above are those contained within the area A bounded by the solid line 20 of the ternary diagram shown in FIG. 5. Compositions outside area A form much poorer glasses and some of them are completely or partially crystalline or otherwise unsuitable. However, minor additions of other glass-forming oxides, modifiers or alkalies may be made in the glasses in area A without substantially changing the composition or altering the effectiveness of the glass in accordance with the invention. Also, as indicated above, in some instances it has been possible to substitute tungsten trioxide for molybdenum trioxide to make satisfactory glasses.

Basic binary antimony borate glasses have been made with compositions indicated by the dots along the right-hand boundary of the FIG. 5 diagram. Those glasses possess the desirable properties of low softening point and relative inertness with respect to molybdenum and nickel. Other dots within area A indicate ternary compositions which are preferred because of enhanced wetting of the molybdenum lead wire and improved stability. Still other dots outside area A indicate compositions which are unsuitable.

The preferred antimony molybdenum borate compositions are those within area A of FIG. 5 when bounded by the solid line 20 as foreshortened by the broken line 21 within the right-hand boundary and which represents a minimum molybdenum content of about 2.5 percent by weight. The single preferred composition of 65 percent $Sb_2O_3$, 30% $B_2O_3$ and 5% $MoO_3$ is indicated by the dot 22.

Ternary compositions which have been prepared and are shown by the dots within area A of FIG. 5 have the following compositions in percent by weight:

| $Sb_2O_3$ | $B_2O_3$ | $MoO_3$ |
|---|---|---|
| 55 | 35 | 10 |
| 60 | 25 | 15 |
| 61.60 | 28.40 | 10.00 |
| 63.30 | 29.20 | 7.50 |
| 65.00 | 15.00 | 20.00 |
| 65.00 | 30.00 | 5.00 |
| 66.70 | 30.80 | 2.50 |
| 70.00 | 15.00 | 15.00 |
| 75.00 | 15.00 | 10.00 |

The binary compositions indicated by dots along the right-hand boundary of FIG. 5 are as follows:

| $Sb_2O_3$ | $B_2O_3$ |
|---|---|
| 90.71 | 9.29 |
| 86.26 | 13.74 |
| 80.72 | 19.28 |
| 73.63 | 26.37 |
| 68.40 | 31.60 |
| 64.22 | 35.78 |
| 51.15 | 48.86 |

What we claim as new and desire to secure by Letters Patent of the United States is:

1. An antimony borate glass containing $MoO_3$ and having a composition within the area A in FIG. 5 bounded by the solid line 20 as foreshortened by the dotted line 21.

2. A glass as in claim 1 and consisting essentially, by weight, of approximately 65% $Sb_2O_3$, 30% $B_2O_3$ and 5% $MoO_3$.

* * * * *

PO-1050
(5/69)

UNITED STATES PATENT OFFICE
CERTIFICATE OF CORRECTION

Patent No. 3,652,302          Dated March 28, 1972

Inventor(s) Victor A. Levand, Jr., Gene I. Thomasson, Richard H. Holcomb

It is certified that error appears in the above-identified patent and that said Letters Patent are hereby corrected as shown below:

On the front page, Column 1, after "44121" add:

--[73] Assignee: General Electric Company--

Signed and sealed this 8th day of August 1972.

(SEAL)
Attest:

EDWARD M. FLETCHER, JR.          ROBERT GOTTSCHALK
Attesting Officer          Commissioner of Patents